(12) United States Patent
Hatamori

(10) Patent No.: US 7,779,293 B2
(45) Date of Patent: Aug. 17, 2010

(54) TECHNOLOGY TO CONTROL INPUT/OUTPUT DEVICE BRIDGES

(75) Inventor: Shuei Hatamori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 897 days.

(21) Appl. No.: 10/998,935

(22) Filed: Nov. 30, 2004

(65) Prior Publication Data
US 2006/0059389 A1  Mar. 16, 2006

(30) Foreign Application Priority Data
Aug. 31, 2004 (JP) ............................. 2004-252461

(51) Int. Cl.
*G06F 11/00* (2006.01)

(52) U.S. Cl. .................. 714/6; 714/5; 714/7; 714/43; 714/44; 714/56

(58) Field of Classification Search .............. 714/5, 714/6, 43, 44, 56, 7; 710/306
See application file for complete search history.

(56) References Cited

U.S. PATENT DOCUMENTS

| | | | | |
|---|---|---|---|---|
| 5,793,943 | A * | 8/1998 | Noll ............................... | 714/6 |
| 6,112,311 | A * | 8/2000 | Beardsley et al. .............. | 714/3 |
| 6,378,021 | B1 | 4/2002 | Okazawa et al. | |
| 6,633,996 | B1 * | 10/2003 | Suffin et al. .................... | 714/4 |
| 6,807,596 | B2 * | 10/2004 | Erickson et al. ............. | 710/301 |
| 6,832,311 | B2 | 12/2004 | Morisawa | |
| 6,952,792 | B2 * | 10/2005 | Emberty et al. ................. | 714/5 |
| 6,961,826 | B2 * | 11/2005 | Garnett et al. .............. | 711/144 |
| 7,028,215 | B2 * | 4/2006 | Depew et al. .................. | 714/7 |
| 7,093,043 | B2 * | 8/2006 | Tan et al. .................... | 710/104 |
| 7,137,029 | B2 | 11/2006 | Koishi | |
| 7,143,275 | B2 * | 11/2006 | Cepulis et al. ................. | 713/1 |
| 7,398,427 | B2 * | 7/2008 | Arndt et al. ................... | 714/43 |
| 2002/0038328 | A1 | 3/2002 | Morisawa | |
| 2003/0023801 | A1 * | 1/2003 | Erickson et al. ............. | 710/301 |
| 2004/0153584 | A1 | 8/2004 | Koishi | |

FOREIGN PATENT DOCUMENTS

JP   7-182189   7/1995
JP   11-232237  8/1999

(Continued)

OTHER PUBLICATIONS

"NEC Express 5800/ft server", Nikkei Computer, Japan, Nikkei Business Publications, Inc., Jul. 12, 2004, No. 604, pp. 92-95.

(Continued)

*Primary Examiner*—Joshua A Lohn
(74) *Attorney, Agent, or Firm*—Staas & Halsey LLP

(57) ABSTRACT

A system controlling apparatus includes a renewal detecting unit that acquires FWD data from an FWD of an operations system core I/O device bridge and stores the acquired FWD data in an FWD data storing unit. If an operations system core I/O device bridge fails, an FWD data copy processing unit copies the FWD data to an FWD of a standby system core I/O device bridge; and a system is rebooted after an operations bridge switchover processing unit switches OFF the operations system core I/O device bridge and switches ON the standby system core I/O device bridge.

7 Claims, 6 Drawing Sheets

FOREIGN PATENT DOCUMENTS

| | | |
|---|---|---|
| JP | 2002-99436 | 4/2002 |
| JP | 2003-316752 | 11/2003 |
| JP | 2004-62589 | 2/2004 |
| JP | 2004-164394 | 6/2004 |

OTHER PUBLICATIONS

Japanese Office Action for corresponding patent application No. 2004-252461 mailed on Mar. 16, 2010.

Partial Translation of "NEC Express 5800/ft server", Nikkei Computer, Japan, Nikkei Business Publications, Inc., Jul. 12, 2004, No. 604, pp. 92-95 Partial.

Partial English Translation of the Japanese Office Action mailed Mar. 16, 2010 in corresponding Japanese Patent Application 2004-252461.

* cited by examiner

TECHNOLOGY TO CONTROL INPUT/OUTPUT DEVICE BRIDGES

BACKGROUND OF THE INVENTION

1) Field of the Invention

The present invention relates to a technology for controlling different devices that are included in a computer system.

2) Description of the Related Art

In recent years, computer systems are provided with chipsets to control interactions between different devices that are included in the computer systems. Current mainstream chipsets, listed in "ASCII24", online, search on Aug. 5, 2004, URL:http://ascii24.com/news/columns/10104/article/2000/06/06/619437-000.html, are configured from north bridge and south bridge circuits. Hereinafter, a south bridge circuit is designated by "operations system core I/O device bridge".

FIG. 6 is a block diagram of an exemplary conventional computer system. The computer system includes a central processing unit (CPU) cluster, a memory cluster, a memory controller, an input/output (I/O) controller, a system controlling apparatus, an operations system core I/O device bridge, and a plurality of I/O device bridges. The system controlling apparatus controls, via the I/O controller, the CPU cluster, the memory cluster, the memory controller, the operations system core I/O device bridge, and the I/O device bridges.

The operations system core I/O device bridge performs an important role in the computer system. The operations system core I/O device bridge controls a flow of data between the I/O controller and a firmware device (FWD), a video graphics array (VGA), and a system management LAN controller (SLAN). The operations system core I/O device bridge causes the FWD to maintain information, such as a BIOS and the system configuration that are necessary for operating the computer system, and utilizes this information to operate the computer system.

However, the conventional computer systems are equipped with only one operations system core I/O device bridge. Therefore, when the operations system core I/O device bridge fails, the entire system stops and the system cannot be rebooted until the faulty operations system core I/O device bridge is replaced with a properly functioning operations system core I/O device bridge. Thus, there was a problem of not being able to quickly restore the system. If the computer system is used as a server and has a faulty operations system core I/O device bridge, delays in system rebooting become more serious.

SUMMARY OF THE INVENTION

A system controlling apparatus according to an aspect of the present invention controls a plurality of devices that are included in a computer system. The system controlling apparatus includes a system information acquiring unit that acquires system information, which includes a BIOS and system configuration information, that is stored in a device connected subordinately to an operations device bridge that is an operating core device bridge; a system information storing unit that stores the system information acquired by the system information acquiring unit; and a switchover processing unit that stores the system information in a device that is connected subordinately to a replacement device bridge which is a core device bridge that replaces an operations device bridge if the operations device bridge fails, and switches the operations device bridge to the replacement device bridge.

A method according to another aspect of the present invention is a method for controlling a plurality of devices that are included in a computer system. The method includes acquiring system information, which includes a BIOS and system configuration information, that is stored in a device connected subordinately to an operations device bridge that is an operating core device bridge; and storing the system information acquired in a device that is connected subordinately to a replacement device bridge which is a core device bridge that replaces an operations device bridge if the operations device bridge fails, and switching-over the operations device bridge to the replacement device bridge.

A computer system according to still another aspect of the present invention includes a plurality of devices and a controlling apparatus that controls the devices, wherein the devices include a first device and at least one second device, the first device being an operating core device and includes a first memory for storing system information that is information required for operating the computer system, the second device includes a second memory having a capacity sufficient for storing the system information. The controlling apparatus includes a detecting unit that detects whether a failure has occurred in the first device; an information transferring unit that transfers the system information from the first memory of the first device to the second memory of the second device; and a rebooting unit that reboots the computer system. If the detecting unit detects that a failure has occurred in the first device, the information transferring unit transfers the system information from the first memory of the first device to the second memory of the second device, and a rebooting unit reboots the computer system.

A computer-readable recording medium according to still another aspect of the present invention stores therein a computer program that realizes on a computer the above method according to the present invention.

The other objects, features, and advantages of the present invention are specifically set forth in or will become apparent from the following detailed description of the invention when read in conjunction with the accompanying drawings.

DETAILED DESCRIPTION

Exemplary embodiments of a system controlling apparatus, a system controlling method, and a computer product according to the present invention will be described below with reference to accompanying drawings.

Figure 1:
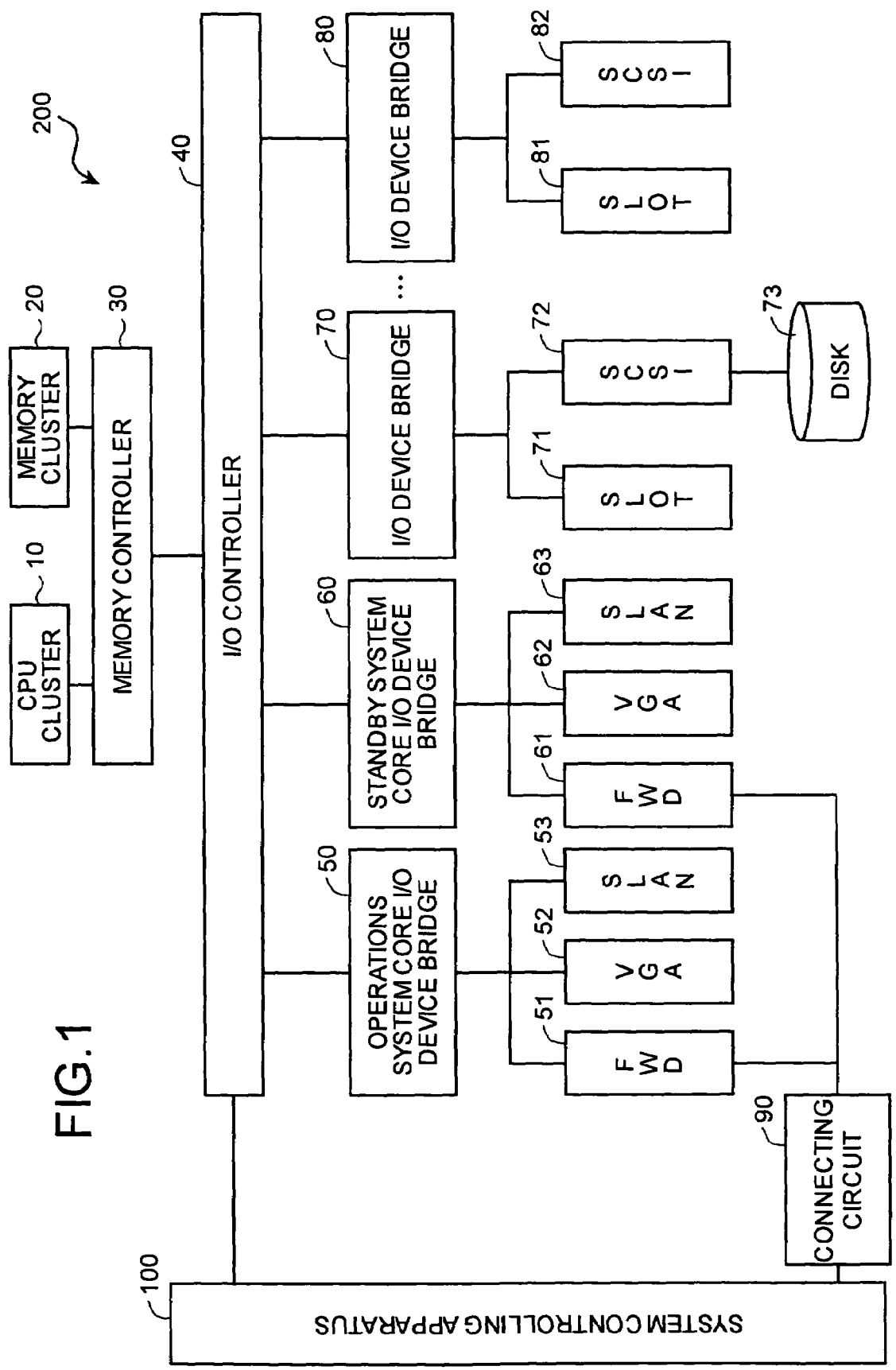
FIG. 1 is a block diagram of a computer system that includes a system controlling apparatus according to an embodiment of the present invention.

First, a computer system that includes a system controlling apparatus according to an embodiment of the present invention is explained. FIG. 1 is a block diagram of a computer system 200 that includes a system controlling apparatus 100 according to an embodiment of the present invention.

As shown in FIG. 1, the computer system 200 includes a central processing unit (CPU) cluster 10, a memory cluster 20, a memory controller 30, an input/output (I/O) controller 40, an operations system core I/O device bridge 50, a standby system core I/O device bridge 60, two I/O device bridges 70 and 80, a connecting circuit 90, and the system controlling apparatus 100. Although, to simplify the explanation, two I/O device bridges 70 and 80 are shown in FIG. 1, the computer system 200 can have any number of I/O device bridges.

The CPU cluster 10 is the nerve center of the computer system 200 and performs control and data computation/processing of each apparatus or units shown in FIG. 1. The memory cluster 20 stores the computer programs that the CPU cluster 10 executes.

The memory controller 30 is connected to the CPU cluster 10, the memory cluster 20, and the I/O controller 40. The memory controller 30 controls access from the CPU cluster 10 and the I/O controller 40 to the memory cluster 20.

The I/O controller 40 is connected to the memory controller 30, the operations system core I/O device bridge 50, the standby system core I/O device bridge 60, and the I/O device bridges 70 and 80. The I/O controller 40 controls access from the operations system core I/O device bridge 50, the standby system core I/O device bridge 60, and the I/O device bridges 70 and 80 to the memory controller 30.

The operations system core I/O device bridge 50 is an operating core I/O device bridge, and the standby system core I/O device bridge 60 is a core I/O device bridge that is the backup for the operations system core I/O device bridge 50.

If the operations system core I/O device bridge 50 fails, switching is performed from the operations system core I/O device bridge 50 to the standby system core I/O device bridge 60 by switching the operations system core I/O device bridge 50 OFF and switching the standby system core I/O device bridge 60 ON.

Figure 2:
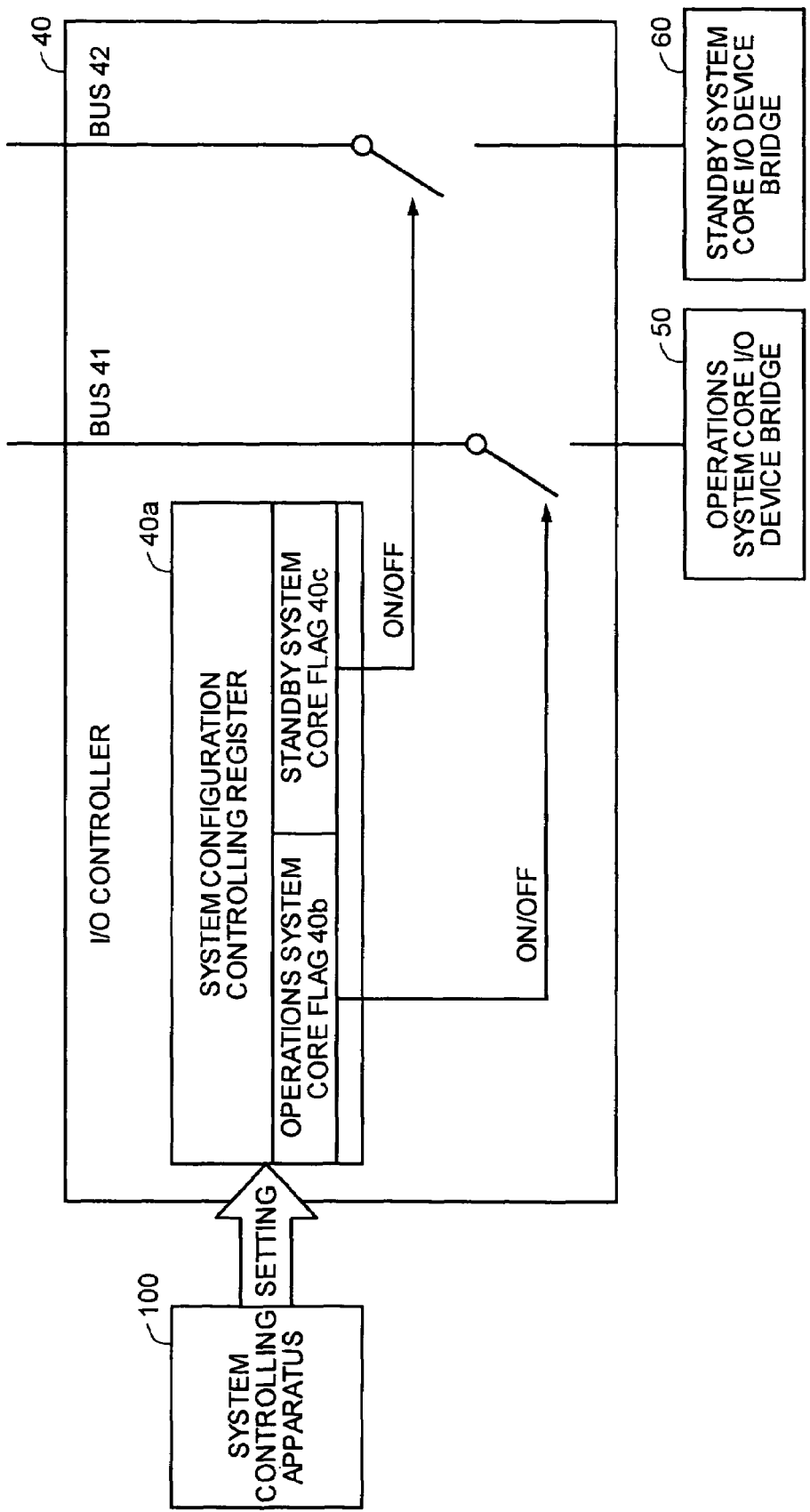
FIG. 2 is an explanatory diagram of processing in an I/O controller shown in FIG. 1.

FIG. 2 is an explanatory diagram to explain a switching process for a switchover from the operations system core I/O device bridge 50 to the standby system core I/O device bridge 60.

The I/O controller 40 has a system configuration controlling register 40a. The system configuration controlling register 40a stores an operations system core flag 40b and a standby system core flag 40c.

The system controlling apparatus 100 sets up bits to indicate specific positions. The system configuration controlling register 40a receives these bits and switches buses relating to the operations system core I/O device bridge 50 and standby system core I/O device bridge 60 ON or OFF.

If bits in the operations system core flag 40b are raised, bus 41, which is linked to the operations system core I/O device bridge 50, becomes ON (or effective). If bits in the standby system core flag 40c are raised, bus 42, which is linked to the standby system core I/O device bridge 60, becomes ON.

In other words, if the operations system core I/O device bridge 50 fails, the system controlling apparatus 100 lowers the bits in the operations system core flag 40b and raises the bits in the standby system core flag 40c. This causes the switchover of the operations system core I/O device bridge 50 to the standby system core I/O device bridge 60.

The operations system core I/O device bridge 50 controls a flow of data from an FWD 51, a VGA 52, and an SLAN 53 to the I/O controller 40. The operations system core I/O device bridge 50 manages the interrupt command issued to the CPU cluster 10 from the FWD 51, the VGA 52, and the SLAN 53.

The FWD 51 accommodates FWD data that includes the BIOS and the system configuration information which is necessary for operating the computer system. If the FWD data is renewed, the FWD 51 sends an FWD data renewal notice to the system controlling apparatus 100.

The VGA 52 processes image data and the like. The SLAN 53 is a LAN controller that is used for system management.

The standby system core I/O device bridge 60 performs processing in a manner similar to the operations system core I/O device bridge 50. The standby system core I/O device bridge 60 ceases operations if the operations system core I/O device bridge 50 is operating normally, and starts operations if a failure occurs in the operations system core I/O device bridge 50.

The standby system core I/O device bridge 60 connects an FWD 61, a VGA 62, and an SLAN 63. The FWD 61 stores the FWD data which is handed over from the system controlling apparatus 100 if the operations system core I/O device bridge 50 fails. The VGA 62 and the SLAN 63 are similar to the VGA 52 and the SLAN 53 above, so explanations are omitted.

The I/O device bridge 70 controls an interchange of data between the I/O controller 40, a slot 71, and a SCSI 72. The slot 71 is for connecting peripheral equipment. The SCSI 72 is for connecting hard disks, compact disc read-only memory (CD-ROM) drives, and the like. The SCSI 72 in the present embodiment is connected to a hard disk shown as a disk 73.

The I/O device bridge 80 controls an interchange of data between the I/O controller 40, a slot 81, and a SCSI 82. The slot 81 and the SCSI 82 are similar to the slot 71 and the SCSI 72, so an explanation is omitted.

The connecting circuit 90 connects the system controlling apparatus 100 to the FWD 51 and the FWD 61.

The system controlling apparatus 100 switches the operations system core I/O device bridge 50 to the standby system core I/O device bridge 60 if a failure occurs in the operations system core I/O device bridge 50, and operates the standby system core I/O device bridge 60.

Figure 3:
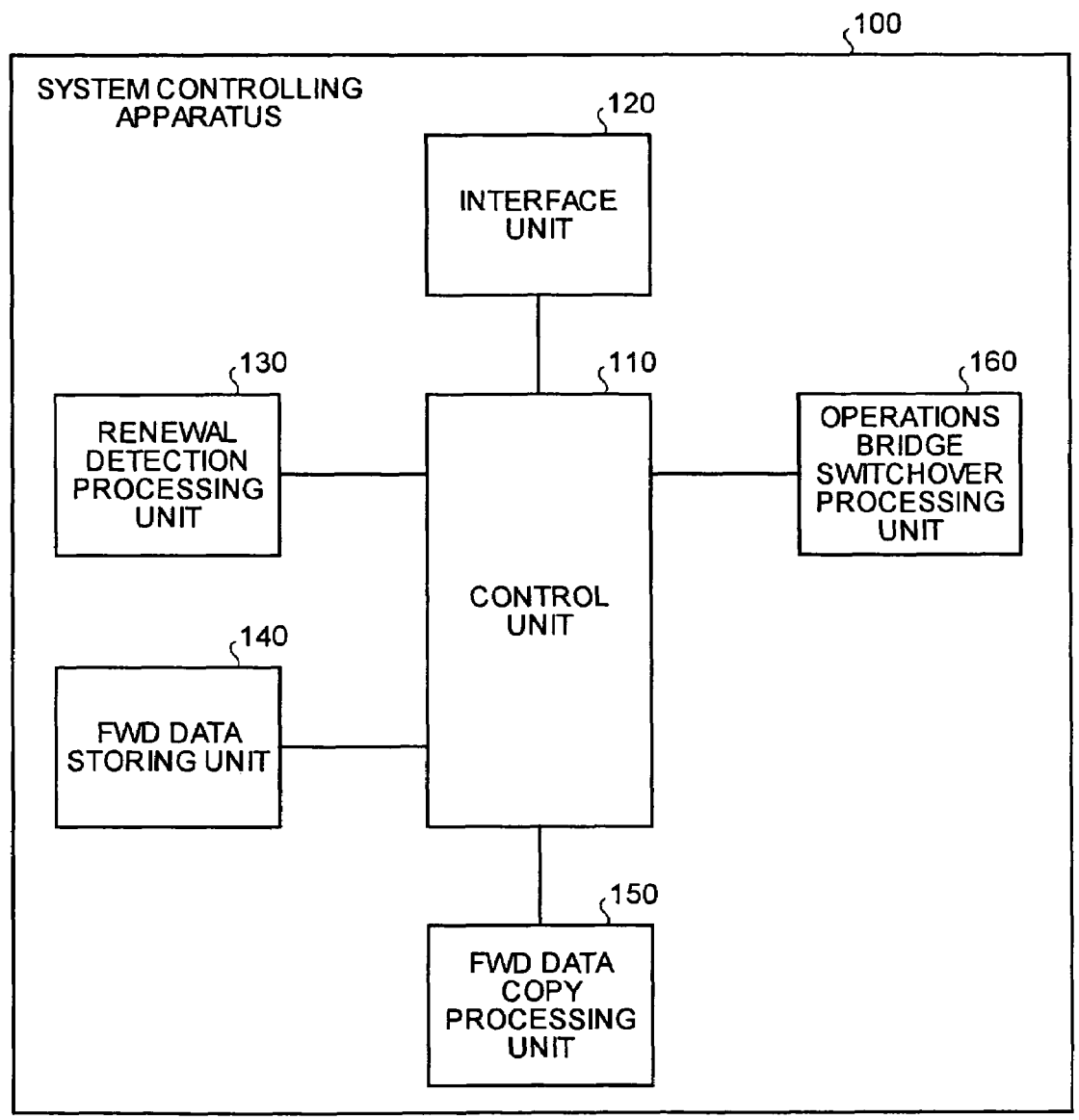
FIG. 3 is a functional block diagram of the system controlling apparatus shown in FIG. 1.

FIG. 3 is a functional block diagram of the system controlling apparatus 100. The system controlling apparatus 100 includes a control unit 110, an interface unit 120, a renewal detection processing unit 130, an FWD data storing unit 140, an FWD data copy processing unit 150, and an operations bridge switchover processing unit 160.

The control unit 110 controls the entire system controlling apparatus 100. The interface unit 120 is a processing device which performs the delivery and receipt of data between the I/O controller 40 and the connecting circuit 90.

The renewal detection processing unit 130 acquires renewed FWD data when the FWD data recorded in the FWD 51 is renewed, and makes the FWD data storing unit 140 record the renewed FWD data.

The FWD data storing unit 140 replaces the old FWD data with the renewed FWD data whenever the renewed FWD data is received.

When the operations system core I/O device bridge 50 fails, the FWD data copy processing unit 150 receives the FWD data from the FWD data storing unit 140, and stores the FWD data in the FWD 61 that is connected subordinately to the standby system core I/O device bridge 60.

After the FWD data copy processing unit 150 has finished copying of the FWD data to the FWD 61, the operations bridge switchover processing unit 160 switches the bus to the operations system core I/O device bridge 50 OFF and switches the bus to the standby system core I/O device bridge 60 ON. The computer system is rebooted upon completion of the switchover.

Figure 4:
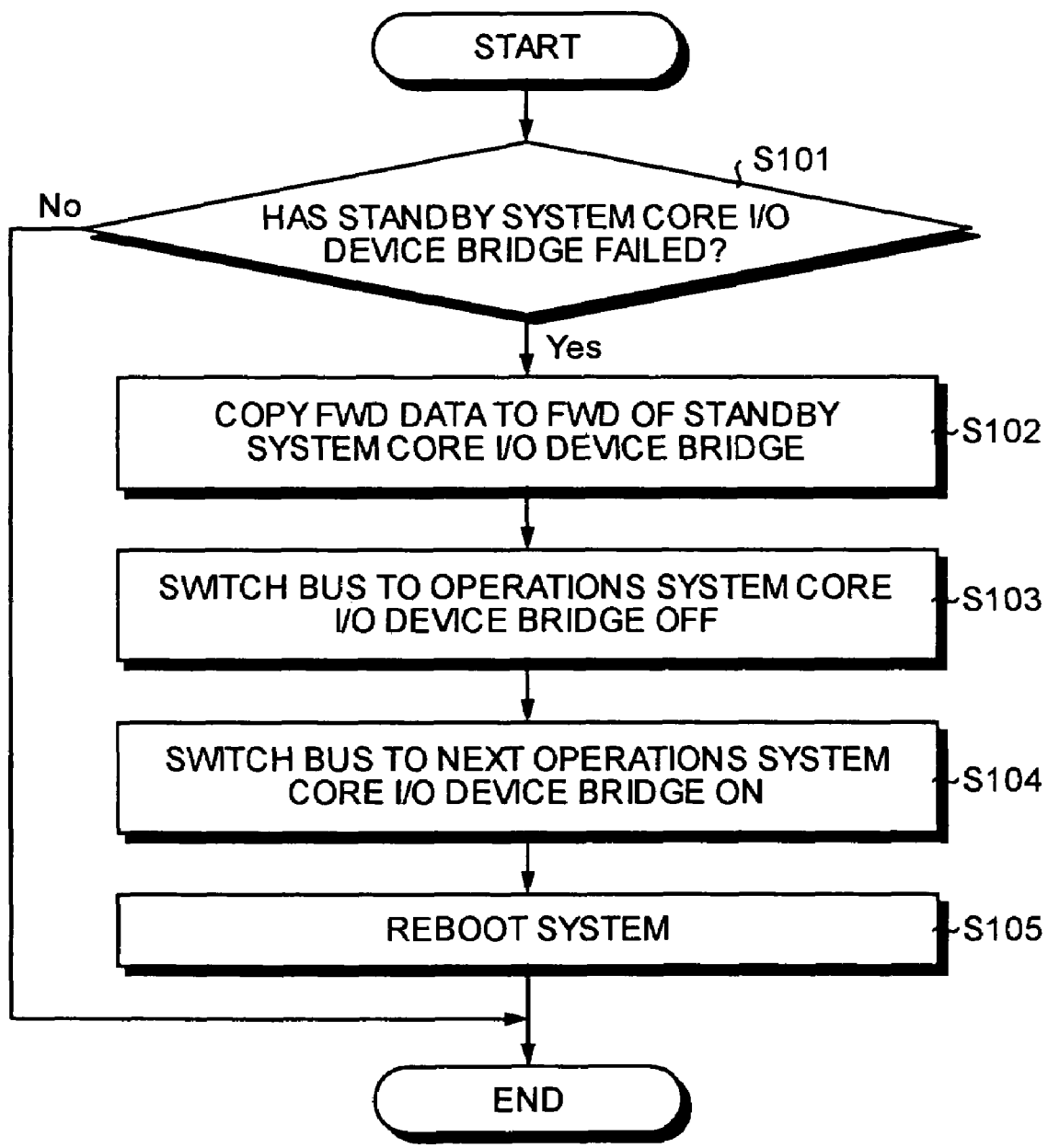
FIG. 4 is a flow chart of a process procedure performed by the system controlling apparatus shown in FIG. 3.

The following is an explanation of the processing performed in the system controlling apparatus shown in FIG. 3. FIG. 4 is a flowchart of the processing sequence in the system controlling apparatus 100 shown in FIG. 3. To begin with, the FWD data copy processing unit 150 of the system controlling apparatus 100 checks whether the operations system core I/O device bridge 50 (step S101) has failed.

If the operations system core I/O device bridge 50 is functioning properly (step S101: No), processing is completed. However, if the operations system core I/O device bridge 50 has failed (step S101: Yes), the FWD data copy processing unit 150 copies the FWD data from the FWD data storing unit 140 to the FWD 61 that is subordinate to the standby system core I/O device bridge 60 (step S102). Subsequently, the operations bridge switchover processing unit 160 switches the bus to the faulty operations system core I/O device bridge 50 OFF (step S103) and switches the bus to the standby system core I/O device bridge 60 ON (step S104). Finally, the computer system is rebooted (step S105).

In this manner, the FWD data copy processing unit 150 copies the FWD data of the faulty operations system core I/O device bridge 50 to the FWD 61 of the standby system core I/O device bridge 60. The operations bridge switchover processing unit 160 switches-over from the faulty operations system core I/O device bridge 50 to the standby system core I/O device bridge 60. Therefore, an efficient reactivation of the system is performed.

As described above, the system controlling apparatus 100 can quickly reboot and recover the system if the operations system core I/O device bridge 50 fails.

In the present embodiment, the system controlling apparatus 100 quickly recovers the system using the standby system core I/O device bridge if the operations system core I/O device bridge includes a single logical system (hereinafter "node"). If a plurality of nodes and a plurality of operations system core I/O device bridges exist, the system controlling apparatus 100 can, in a manner similar to the case of the single node, quickly recover the system.

Figure 5:
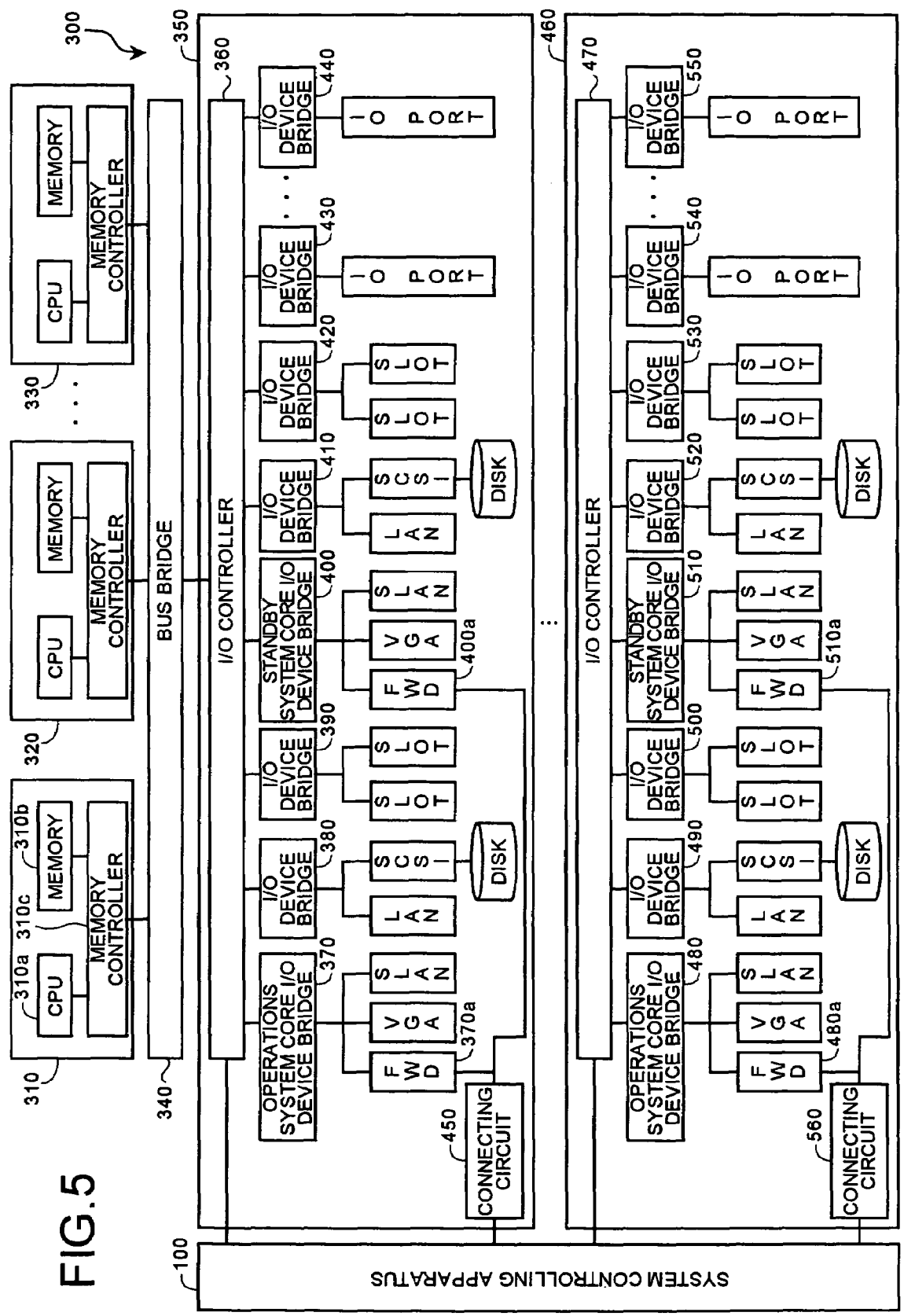
FIG. 5 is an exemplary diagram of a computer system having a system controlling apparatus that controls a plurality of nodes.
Figure 6:
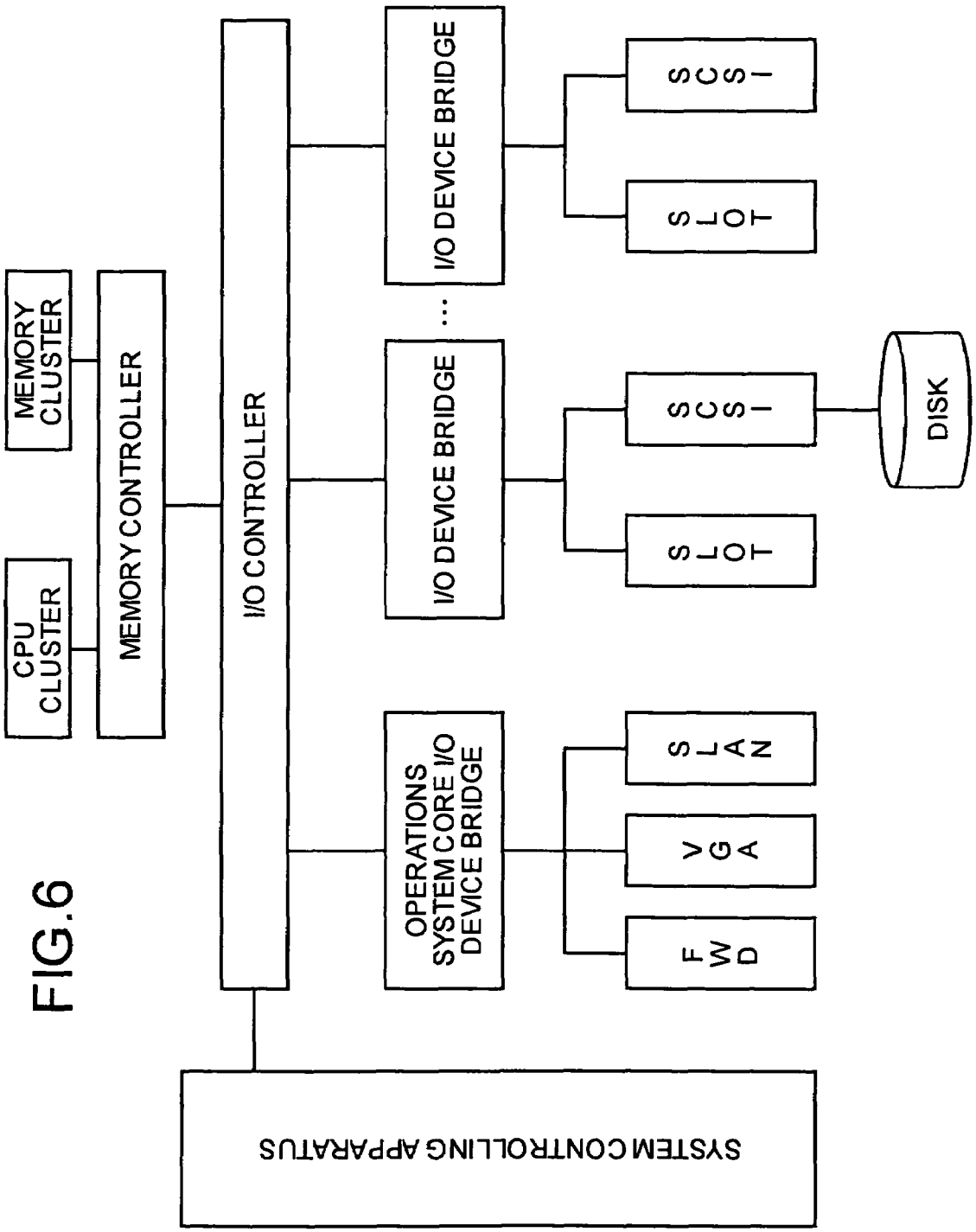
FIG. 6 is a block diagram of a conventional computer system.

FIG. 5 is an example of a computer system in which a system controlling apparatus controls a plurality of nodes. As shown in FIG. 5, a computer system 300 includes a CPU 310a; boards 310 to 330 (hereinafter "SB board") that includes a plurality of memories 310b and memory controllers 310c; a bus bridge 340; an I/O controller 360; an operations system core I/O device bridge 370; I/O device bridges 380, 390, 410, 420, 430, 440; a standby system core I/O device bridge 400; and boards 350, 460 (hereinafter, "IOU board") that include a connecting circuit 450.

To facilitate the explanation here, three SB boards 310 to 330 and two IOU boards 350 and 460 are shown, but the computer system 300 can connect any number of SB boards and IOU boards at the user's discretion. As one example in the present embodiment, the SB board 310, the SB board 320, and the IOU board 350 comprise one node; and the SB board 330 and the IOU board 460 comprise another node.

The SB board 310 includes the CPU 310a, the memory 310b, and the memory controller 310c. The CPU 310a, the memory 310b, and the memory controller 310c are the same as the CPU cluster 10, the memory cluster 20, and the memory controller 30 shown in FIG. 1, so an explanation is omitted.

The bus bridge 340 is connected to each of the SB boards 310 to 330, the IOU board 350, and the IOU board 460.

The IOU board 350 includes the I/O controller 360; the operations system core I/O device bridge 370; the I/O device bridges 380, 390, 410, 420, 430, and 440; the standby system core I/O device bridge 400; and the connecting circuit 450. IOU board 460 is similar to IOU board 350, so an explanation is omitted.

The I/O controller 360, the operations system core I/O device bridge 370, the standby system core I/O device bridge 400, the I/O device bridges 380, 390, 410, 420, 430, and 440, the connecting circuit 450 are similar to the I/O controller 40, the operations system core I/O device bridge 50, the standby system core I/O device bridge 60, the I/O device bridges 70 and 80, and the connecting circuit 90. Therefore, an explanation is omitted.

An FWD 370a is connected to the operations system core I/O device bridge 370, and an FWD 400a is connected to the standby system core I/O device bridge 400. The FWD 370a stores FWD data.

The IOU board 460 includes an I/O controller 470; an operations system core I/O device bridge 480; I/O device bridges 490, 500, 520, 530, 540, and 550; a standby system core I/O device bridge 510; and a connecting circuit 560.

The I/O controller 470, the operations system core I/O device bridge 480, the standby system core I/O device bridge 510, the I/O device bridges 490, 500, 520, 530, 540, and 550, the connecting circuit 560 are similar to the I/O controller 40, the operations system core I/O device bridge 50, the standby system core I/O device bridge 60, the I/O device bridges 70 and 80, and the connecting circuit 90. Therefore, an explanation is omitted.

An FWD 480a is connected to the operations system core I/O device bridge 480, and an FWD 510a is connected to the standby system core I/O device bridge 510. The FWD 480a stores FWD data.

Next, processing performed by the system controlling apparatus 100 is explained. The system controlling apparatus 100 stores the FWD data that was stored in the FWD 370a and the FWD 480a. If the operations system core I/O device bridge 370 fails, the FWD data that was acquired from the FWD 370a is copied by the FWD data copy processing unit 150 to the FWD 400a. After the operations system core I/O device bridge 370 is switched-over to the standby system core I/O device bridge 400, the system reboots.

If the operations system core I/O device bridge 480 fails, the system controlling apparatus 100 copies the FWD data acquired from the FWD 480a to the FWD 510a. After the operations system core I/O device bridge 480 is switched-over to the standby system core I/O device bridge 510, the system reboots.

In this manner, the system controlling apparatus 100 copies FWD data to the FWD of the corresponding, standby system core I/O device bridge if the operations system core I/O device bridge fails even if there are a plurality of nodes, and can quickly recover the system by rebooting the system.

According to the present invention, it becomes possible to quickly recover the system even if the operations system core I/O device bridge fails.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A system controlling apparatus that controls a plurality of devices that are included in a computer system, comprising:
   a system information acquiring unit that acquires system information which includes a BIOS and system configuration information, that is stored in an operations device bridge that is an operating core device bridge;
   a system information storing unit that stores the system information acquired by the system information acquiring unit; and a switchover processing unit that switches over from a faulty operations device bridge to a replacement device bridge if the operating core device bride fails,
wherein the system information acquiring unit duplicates the stored system information in the replacement bridge before the operations device bridge fails if the operating core device bridge fails.

2. The system controlling apparatus according to claim 1, wherein the system information acquiring unit includes a detecting unit that detects whether the system information has been renewed, and
the system information acquiring unit acquires the system information if the detecting unit detects a renewal of the system information.

3. A method for controlling a plurality of devices that are included in a computer system, comprising:
acquiring system information, which includes a BIOS and system configuration information, that is stored in a device connected subordinately to an operations device bridge that is an operating core device bridge; and
switching over from the operations device bridge to a replacement device bridge if the operating core device bridge fails,
the acquiring includes duplicating the stored system information in the replacement device bridge before the operations device bridge fails if the operating core device bridge fails.

4. The method according to claim 3, wherein the acquiring includes
detecting whether the system information has been renewed; and
acquiring the system information if it is detected at the detecting that the system information has been renewed.

5. A computer-readable recording medium that stores therein a computer program that causes a computer to control a plurality of devices that are included in a computer system, the computer program causing the computer to execute:
acquiring system information, which includes a BIOS and system configuration information, that is stored in a device connected subordinately to an operations device bridge that is an operating core device bridge; and
switching over from the operations device bridge to a replacement device bridge if the operating core device bridge fails,
the acquiring includes duplicating the stored system information in the replacement device bridge before the operations device bridge fails if the operating core device bridge fails.

6. The computer-readable recording medium according to claim 5, wherein the acquiring includes
detecting whether the system information has been renewed; and
acquiring the system information if it is detected at the detecting that the system information has been renewed.

7. A computer system comprising:
an operations device bridge that is an operating core device bridge, and that connects a first device subordinately;
a replacement device bridge that is a core device bridge, and that replaces an operations device bridge when the operations device bridge fails and that connects a second device subordinately; and
a system controlling apparatus comprising:
a system information acquiring unit that acquires system information that is stored in the first device during a time the operations device bridge is normally operating, the system information including a BIOS and a system configuration information;
a system information storing unit that stores the system information acquired by the system information acquiring unit, and
a switchover processing unit that that switches over from a faulty operations device bridge to a replacement device bridge if the operating core device bride fails;
wherein the system information acquiring unit duplicates the stored system information in the replacement bridge before the operations device bridge fails if the operating core device bridge fails.

* * * * *

UNITED STATES PATENT AND TRADEMARK OFFICE
CERTIFICATE OF CORRECTION

| | | |
|---|---|---|
| PATENT NO. | : 7,779,293 B2 | Page 1 of 1 |
| APPLICATION NO. | : 10/998935 | |
| DATED | : August 17, 2010 | |
| INVENTOR(S) | : Shuei Hatamori | |

It is certified that error appears in the above-identified patent and that said Letters Patent is hereby corrected as shown below:

Column 7, Line 3 in Claim 1, delete "bride" and insert --bridge--, therefor.

Column 8, Line 32 in Claim 7, before "switches" delete "that".

Column 8, Line 34 in Claim 7, delete "bride" and insert --bridge--, therefor.

Signed and Sealed this
Twenty-fifth Day of January, 2011

David J. Kappos
*Director of the United States Patent and Trademark Office*